UNITED STATES PATENT OFFICE.

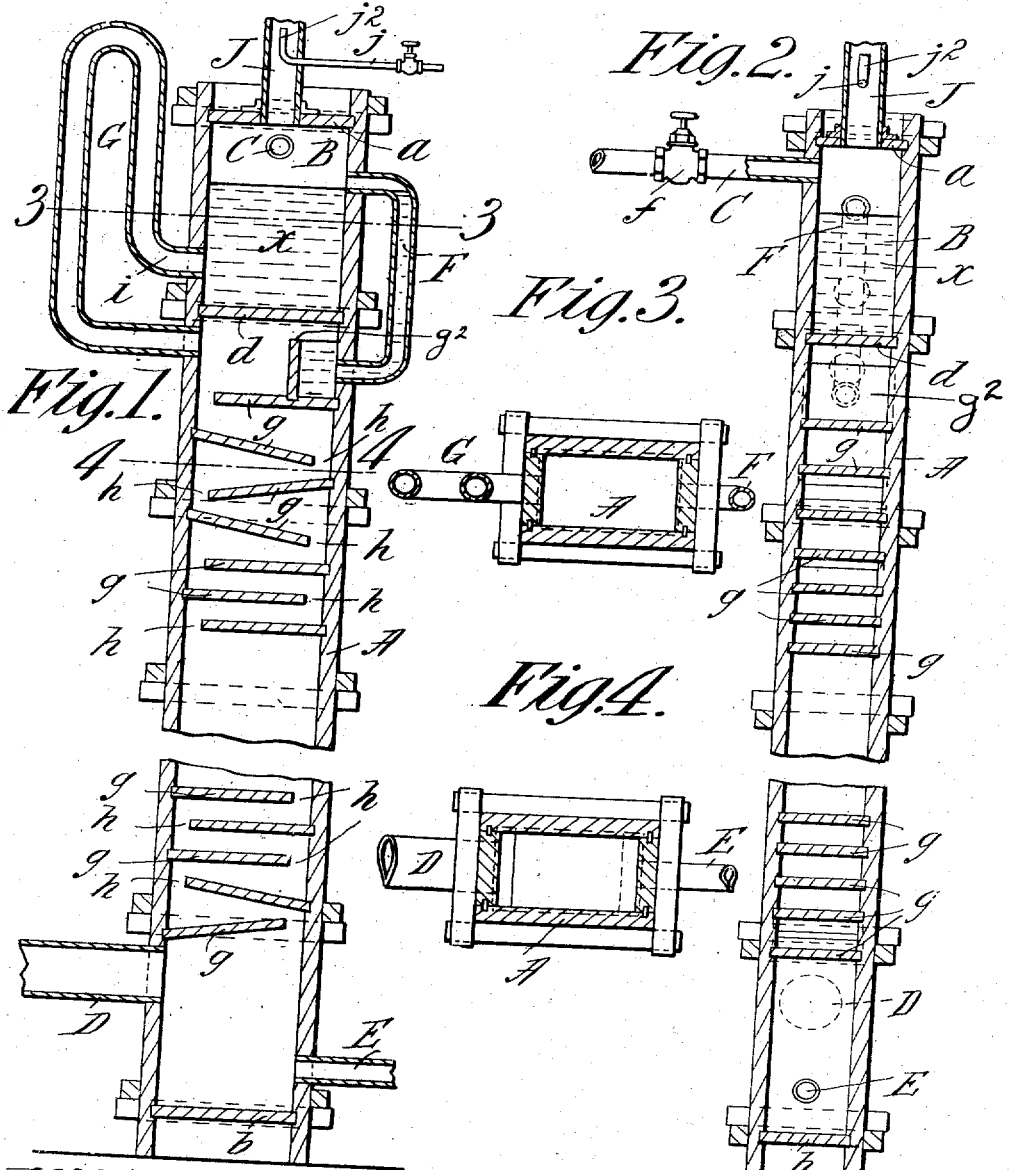

JOHN CAMPBELL MURRAY, OF BANGOR, MAINE, ASSIGNOR OF ONE-THIRD TO GEORGE C. CRAFTS, OF BANGOR, MAINE, AND ONE-THIRD TO GEORGE W. FORTIER, OF ORONO, MAINE.

APPARATUS FOR MAKING BISULFITE LIQUOR.

No. 846,499.

Specification of Letters Patent.

Patented March 12, 1907.

Application filed October 16, 1906. Serial No. 339,243.

*To all whom it may concern:*

Be it known that I, JOHN CAMPBELL MURRAY, a citizen of the United States of America, and a resident of Bangor, in the county of Penobscot and State of Maine, have invented certain new and useful Improvements in Apparatus for Making Bisulfite Liquor, of which the following is a full, clear, and exact description.

This invention relates to improvements in an apparatus or means for the manufacture or production of bisulfite liquor, or papermaker's acid, which is used in the manufacture of sulfite pulp and also employed in the manufacture of sulfate pulp.

This bisulfite liquor or acid, as well known, consists of lime-water (or "milk of lime," as it is sometimes termed) thoroughly saturated or impregnated with sulfur-dioxid gas, (the cooled fumes of burnt sulfur.)

The apparatus heretofore commonly employed for the production of the bisulfite liquor has been one of complicated construction, usually embodying series of agitators, lead and bronze conduits and parts, necessitating very great cost in the making; and the object of this invention is to simplify the method of making the liquor and in providing for the manufacture thereof an apparatus of new and simplified character and much less expensive than has heretofore been necessary.

The invention consists in the provision of an absorption apparatus of the tower and baffle-plate type of marked simplicity and ease of construction and effectiveness of action. The major portion of the interior of the tower is provided with staggered baffle-plates over which the lime-water takes a sinuous course in its downward flow. At the top of the tower and supplying the liquid to these baffle-plates is a reservoir in which is maintained a considerable head of lime-water, there being provided a suitable liquid-inlet for this reservoir. Suitable connection is established between the reservoir and the main portion of the interior of the tower, this connection being of such nature that a considerable depth of liquid is at all times maintained in the reservoir. This provision of a unitary tower structure, comprising in its upper portion a liquid-reservoir and therebeneath a region for causing the descending liquid to flow in a sinuous course in contact with the gas, constitutes a very important phase of my invention and produces a piece of apparatus at once extremely simple in construction and efficient in operation. Besides the ease with which the tower embodying these features may be constructed a further advantage is the elimination of any special support for maintaining the reservoir in an elevated position. One of the main objects of said reservoir is to provide means for absorbing such of the sulfur-dioxid gas admitted at the bottom of the tower as is not taken up in its rise through the descending lime-water; and to this end the gas is preferably not allowed to escape freely after reaching the upper end of the series of baffles, but is led by suction through a siphon-shaped pipe into the body of liquid in the reservoir.

This being the general character of the apparatus, it is the aim of the invention to associate such features in a unitary piece of apparatus in the simplest and strongest fashion possible, and with this end in view the tower consists of a continuous tubular structure closed at bottom and top and provided with an imperforate partition, completely cutting off the reservoir at the top from the major portion of the interior, and with staggered baffle-plates disposed in series beneath said partition and extending to adjacent the bottom of the tower.

One of the features of novelty is the provision of an upright wall extending across the top baffle-plate parallel to the free edge thereof and facing the liquid-inlet pipe leading from the reservoir above. The top of this wall is at a level higher than the discharge end of this pipe, and consequently forms a liquid seal for preventing the gas from flowing through this pipe into the reservoir and causing it to pass through the siphon-shaped pipe provided for its eduction into said reservoir.

The apparatus and mode of its operation are rendered apparent by the accompanying drawings, in conjunction with the following description, and in said drawings—

Figures 1 and 2 are vertical sectional views through the tower-like apparatus on planes centrally therethrough and at right angles to each other. Figs. 3 and 4 are horizontal sectional views as taken on the lines 3 3 and 4 4, Fig. 1.

In the drawings, A represents a tower which may be advantageously of rectangular cross-sectional form, composed of any suitable material, whether wood, concrete, masonry, or otherwise, and having a height of from fifty to one hundred feet, more or less, according to requirements.

The tower has a top wall $a$, a bottom-closing wall $b$, and in its upper portion suitably below the top wall $a$ another wall or partition $d$, whereby an upper chamber B is created, in which may be maintained a body or "head" of lime-water, ("milk of lime," as it is sometimes called,) which is supplied thereinto by the lime-water-inlet pipe C, understood as leading from a suitable source of supply and having a valve $f$ for regulating the inflow.

Leading into the lower portion of the tower, preferably somewhat above the bottom thereof, is a conduit D for the cooled fumes of burnt sulfur, (sulfur dioxid,) and leading from the lower portion of the space within the tower below the point of inlet communication of the sulfur-gas conduit is a discharge-conduit E.

Leading from the aforesaid upper chamber B at a point somewhat above the bottom $d$ of such chamber is a pipe or conduit F, vertically arranged and having upper and lower terminal bends, the upper one connecting into the chamber B, as aforesaid, and the lower one connecting into the space within an upper portion of the tower, but below the bottom of said chamber B.

Between the lower end of the pipe F, communicating into the upper portion of the tower-chamber and the point of communication into the lower portion of the tower-space of the sulfur-gas inlet D, are a plurality of baffle-plates or riffles $g$ $g$, the same having edge-supports at opposite sides of the tower-wall and alternately edgewise oppositely terminating to leave the spaces $h$ $h$, as shown, whereby the course for the descending lime-water delivered from the head thereof in the upper chamber B onto the upper one of the baffle-plates is tortuous or sinuous, and whereby the downwardly gravitatively moving lime-water will be distributed or spread in its zigzag course quite thoroughly over the surfaces of the baffles and throughout great area within the vertical elongated space in the tower, and the sulfur-gas rising from the lower portion of the tower and necessarily having a sinuous or zigzag course from one side to the other through the spaces $h$ and between the baffles or riffles is also thoroughly spread or distributed throughout the tower-chamber, encountering in substantially all of the area therewithin the lime-water having the manner of descent stated, resulting in the lime-water absorbing and becoming thoroughly impregnated up to its potentiality therefor with the sulfur-gas.

The product—bisulfite liquor, or paper-maker's acid—thus made may be drawn off through the outlet-pipe E into a tank or otherwise to be available for use in the making of paper-pulp.

It will be noticed that some of the baffle-plates $g$ are shown as horizontal, while others thereof are reversely downwardly inclined, and the apparatus has been constructed with the baffles in this arrangement with satisfactory results; but a greater number or all of the baffles may be horizontally arranged or they may be arranged inclined, accordingly as a retarded or comparatively rapid descent of the lime-water is desired.

The top baffle-plate $g$ is provided with an upstanding wall $g^2$, which extends across the plate parallel to its free edge, being disposed facing the lower end of the pipe F. As this wall rises above such end of the pipe there is formed a liquid seal at the rear portion of this plate, which effectually prevents the upflowing gas from taking the wrong course to the reservoir B.

A siphon-shaped pipe G connects the upper inclosed chamber B with the portion of the space in the tower near and below the bottom of such chamber, the return bent or U-shaped portion of this pipe G rising above the level at which the lime-water would ever be maintained in the chamber B, and the part $i$ of this siphon-shaped pipe may enter the chamber below the normal lime-water level or above the same.

J represents a suction-pipe having communication with the upper portion of the chamber B, through which a comparatively gentle suction is maintained by any suitable means, that herein indicated being a steam-jet pipe $j$, having its delivery-nozzle $j^2$ upwardly directed in the suction-pipe J.

The object of the suction-pipe J and the siphon-shaped pipe G is to afford means for causing an upward progression of any remnants or surplus of the sulfur-gas (which on reaching the portion of the tower-space above the highest baffles may not have become absorbed by the falling lime-water) within and to be absorbed by the head of lime-water in the upper chamber B in the tower.

I claim—

1. A gas-absorption apparatus consisting of a tower, suitable gas-inlet and liquid-outlet in the lower portion thereof and suitable liquid-inlet and gas-outlet in the upper portion thereof, a partition extending across the interior of the tower near the upper end thereof but below said liquid-inlet and gas-outlet and constituting the upper portion of the tower interior as a liquid-reservoir, a liquid-conduit leading from said reservoir at a point considerably above said partition and discharging into the tower interior thereunderneath, a vertical series of staggered overlapping baffle-plates occupying the tower interior beneath said partition in position to receive the discharge from said conduit, and a pipe distinct from said conduit for conducting the rising gas through the liquid in said reservoir before escaping through the gas-outlet.

2. A gas-absorption apparatus consisting of a tower, suitable gas-inlet and liquid-outlet at the base and suitable liquid-inlet and gas-outlet at the top thereof, an imperforate partition extending completely across the interior of the tower near the upper end thereof but below said liquid-inlet and gas-outlet, thus constituting the upper portion of the tower interior as a liquid-reservoir, a vertical series of staggered overlapping baffle-plates occupying the tower interior beneath said partition, a liquid-conduit leading from said reservoir at a point considerably above the partition and discharging onto the series of baffle-plates therebeneath, and a siphon-shaped gas-conduit leading from beneath and adjacent said partition and opening into the reservoir at a point below the upper end of the liquid-conduit.

3. A gas-absorption apparatus consisting of a tower, suitable gas-inlet and liquid-outlet at the base and suitable liquid-inlet and gas-outlet at the top thereof, an imperforate partition extending completely across the interior of the tower near the upper end thereof but below said liquid-inlet and gas-outlet, thus constituting the upper portion of the tower interior as a liquid-reservoir, a vertical series of staggered overlapping baffle-plates occupying the tower interior beneath said partition, a liquid-conduit leading from said reservoir at a point considerably above the partition and discharging onto the series of baffle-plates therebeneath, a siphon-shaped gas-conduit leading from beneath and adjacent said partition and opening into the reservoir at a point below the upper end of the liquid-conduit, and an upright wall rising from the top baffle-plate to a point above the discharge end of the liquid-conduit and extending from wall to wall of the tower parallel to the free edge of the plate and facing said end of the conduit.

Signed by me at Bangor, Maine, in the presence of two subscribing witnesses.

JOHN CAMPBELL MURRAY.

Witnesses:
WALTER E. HOGAN,
P. B. PALMER.

---

Correction in Letters Patent No. 846,499.

It is hereby certified that the name of the first-mentioned assignee in Letters Patent No. 846,499, granted March 12, 1907, upon the application of John Campbell Murray, of Bangor, Maine, for an improvement in "Apparatus for Making Bisulfite Liquors," was erroneously written and printed "George C. Crafts," whereas said name should have been written and printed *George E. Crafts;* and that the said Letters Patent should be read with this correction therein that the same may conform to the record of the case in the Patent Office.

Signed and sealed this 9th day of April, A. D., 1907.

[SEAL.]

E. B. MOORE,
*Acting Commissioner of Patents.* interior beneath said partition in position to receive the discharge from said conduit, and a pipe distinct from said conduit for conducting the rising gas through the liquid in said reservoir before escaping through the gas-outlet.

2. A gas-absorption apparatus consisting of a tower, suitable gas-inlet and liquid-outlet at the base and suitable liquid-inlet and gas-outlet at the top thereof, an imperforate partition extending completely across the interior of the tower near the upper end thereof but below said liquid-inlet and gas-outlet, thus constituting the upper portion of the tower interior as a liquid-reservoir, a vertical series of staggered overlapping baffle-plates occupying the tower interior beneath said partition, a liquid-conduit leading from said reservoir at a point considerably above the partition and discharging onto the series of baffle-plates therebeneath, and a siphon-shaped gas-conduit leading from beneath and adjacent said partition and opening into the reservoir at a point below the upper end of the liquid-conduit.

3. A gas-absorption apparatus consisting of a tower, suitable gas-inlet and liquid-outlet at the base and suitable liquid-inlet and gas-outlet at the top thereof, an imperforate partition extending completely across the interior of the tower near the upper end thereof but below said liquid-inlet and gas-outlet, thus constituting the upper portion of the tower interior as a liquid-reservoir, a vertical series of staggered overlapping baffle-plates occupying the tower interior beneath said partition, a liquid-conduit leading from said reservoir at a point considerably above the partition and discharging onto the series of baffle-plates therebeneath, a siphon-shaped gas-conduit leading from beneath and adjacent said partition and opening into the reservoir at a point below the upper end of the liquid-conduit, and an upright wall rising from the top baffle-plate to a point above the discharge end of the liquid-conduit and extending from wall to wall of the tower parallel to the free edge of the plate and facing said end of the conduit.

Signed by me at Bangor, Maine, in the presence of two subscribing witnesses.

JOHN CAMPBELL MURRAY.

Witnesses:
WALTER E. HOGAN,
P. B. PALMER.

---

Correction in Letters Patent No. 846,499.

It is hereby certified that the name of the first-mentioned assignee in Letters Patent No. 846,499, granted March 12, 1907, upon the application of John Campbell Murray, of Bangor, Maine, for an improvement in "Apparatus for Making Bisulfite Liquors," was erroneously written and printed "George C. Crafts," whereas said name should have been written and printed *George E. Crafts;* and that the said Letters Patent should be read with this correction therein that the same may conform to the record of the case in the Patent Office.

Signed and sealed this 9th day of April, A. D., 1907.

[SEAL.]

E. B. MOORE,
*Acting Commissioner of Patents.*

It is hereby certified that the name of the first-mentioned assignee in Letters Patent No. 846,499, granted March 12, 1907, upon the application of John Campbell Murray, of Bangor, Maine, for an improvement in "Apparatus for Making Bisulfite Liquors," was erroneously written and printed "George C. Crafts," whereas said name should have been written and printed *George E. Crafts;* and that the said Letters Patent should be read with this correction therein that the same may conform to the record of the case in the Patent Office.

Signed and sealed this 9th day of April, A. D., 1907.

[SEAL.]

E. B. MOORE,
*Acting Commissioner of Patents.*